(12) United States Patent
Yoo et al.

(10) Patent No.: US 10,165,658 B2
(45) Date of Patent: Dec. 25, 2018

(54) MOBILE TERMINAL AND CONTROL METHOD THEREFOR

(71) Applicant: LG ELECTRONICS INC., Seoul (KR)

(72) Inventors: Myungbok Yoo, Seoul (KR); Duksung Kim, Seoul (KR); Sijeong Ro, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/579,792

(22) PCT Filed: Nov. 16, 2015

(86) PCT No.: PCT/KR2015/012271
§ 371 (c)(1),
(2) Date: Dec. 5, 2017

(87) PCT Pub. No.: WO2016/204357
PCT Pub. Date: Dec. 22, 2016

(65) Prior Publication Data
US 2018/0177031 A1 Jun. 21, 2018

(30) Foreign Application Priority Data
Jun. 15, 2015 (KR) .................. 10-2015-0084451

(51) Int. Cl.
*H05B 37/02* (2006.01)
*H04L 12/12* (2006.01)
(Continued)

(52) U.S. Cl.
CPC ......... *H05B 37/0272* (2013.01); *H04L 12/12* (2013.01); *H04L 12/282* (2013.01);
(Continued)

(58) Field of Classification Search
CPC ............. H05B 37/0272; H05B 37/024; H04M 1/7253; H04M 1/72533; H04L 12/2816
See application file for complete search history.

(56) References Cited

U.S. PATENT DOCUMENTS

2009/0278479 A1 11/2009 Platner et al.
2012/0302289 A1* 11/2012 Kang ..................... G06F 3/011
455/557
(Continued)

FOREIGN PATENT DOCUMENTS

KR 10-2014-0095381 A 8/2014
KR 10-2014-0145306 A 12/2014
(Continued)

*Primary Examiner* — Said M Elnoubi
(74) *Attorney, Agent, or Firm* — Birch, Stewart, Kolasch & Birch, LLP

(57) ABSTRACT

The present invention relates to a mobile terminal capable of controlling other apparatus, and a control method therefor. The mobile terminal comprises: a wireless communication unit, which exchanges a wireless signal with a plurality of illuminations; and a control unit, which transmits a control signal to at least some of the illuminations so as to simultaneously control at least some of the plurality of illuminations when receiving identification information regarding the respective plurality of illuminations through the wireless communication unit, wherein the identification information is received in response to a request from the mobile terminal, which is transmitted to at least some of the illuminations installed in a specific indoor area, on the basis of information acquired through the mobile terminal or a separate apparatus, or is transmitted from at least some of the illuminations, which are pre-selected in a predetermined mode from among the illuminations installed in the specific indoor area when the mobile terminal meets predetermined conditions.

13 Claims, 16 Drawing Sheets

(51) Int. Cl.
*H04L 12/28* (2006.01)
*H04M 1/725* (2006.01)
*H04B 5/00* (2006.01)

(52) U.S. Cl.
CPC ......... *H04M 1/725* (2013.01); *H04M 1/7253* (2013.01); *H04M 1/72533* (2013.01); *H05B 37/02* (2013.01); *H04B 5/0031* (2013.01); *H04L 2012/285* (2013.01); *H04L 2012/2841* (2013.01); *Y02B 20/48* (2013.01)

(56) References Cited

U.S. PATENT DOCUMENTS

| | | | | |
|---|---|---|---|---|
| 2015/0163881 A1* | 6/2015 | Pederson | ........... | H05B 33/0863 |
| | | | | 315/154 |
| 2015/0282282 A1* | 10/2015 | Breuer | ............... | H05B 37/0272 |
| | | | | 315/152 |
| 2015/0347114 A1* | 12/2015 | Yoon | ........................ | G06F 8/61 |
| | | | | 235/375 |
| 2016/0095190 A1* | 3/2016 | Arulandu | ........... | H05B 37/0227 |
| | | | | 315/153 |
| 2017/0307722 A1* | 10/2017 | Zhang | ................... | G01S 5/0242 |

FOREIGN PATENT DOCUMENTS

| | | |
|---|---|---|
| KR | 10-2015-0026329 A | 3/2015 |
| KR | 10-2015-0026401 A | 3/2015 |

* cited by examiner

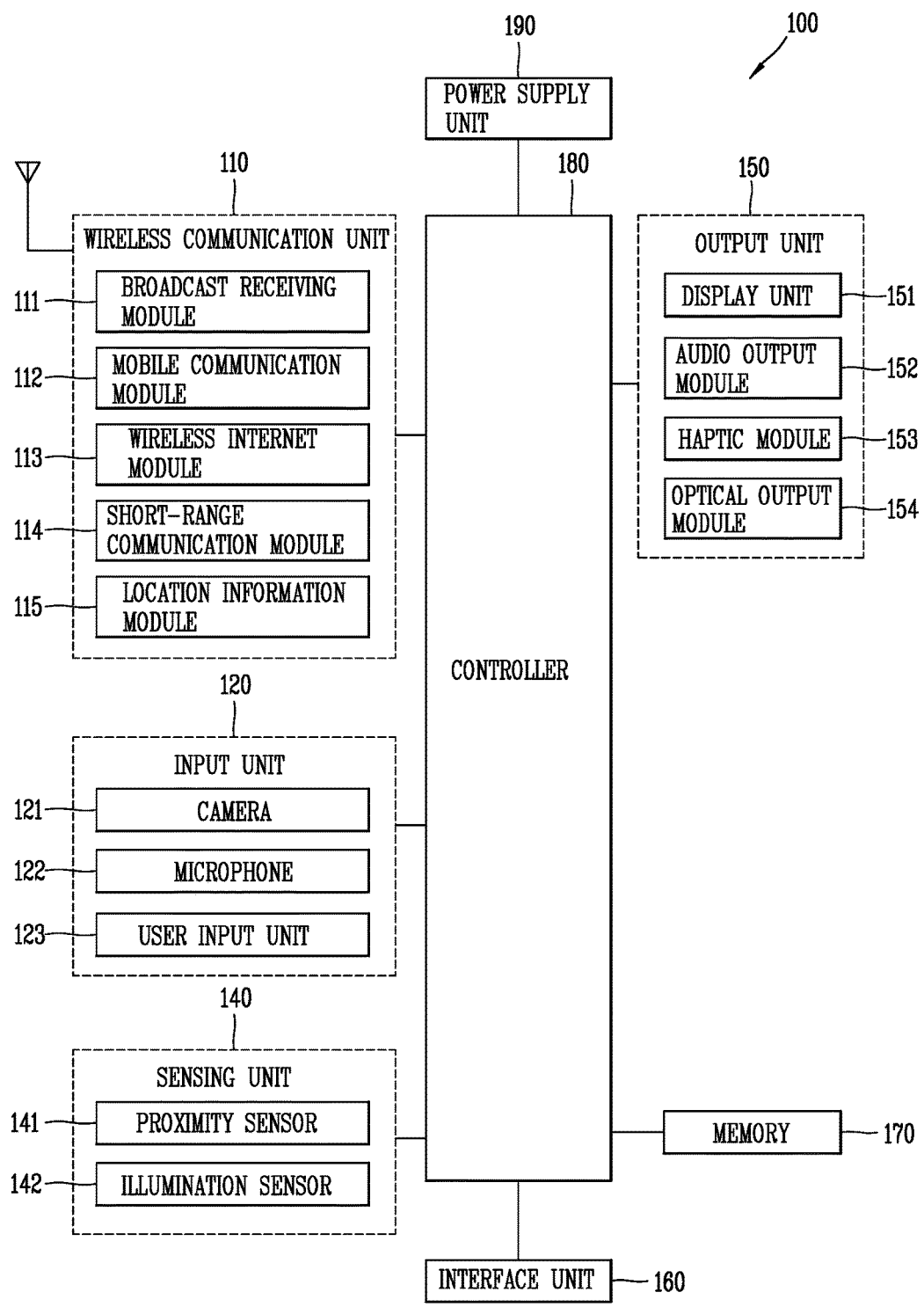

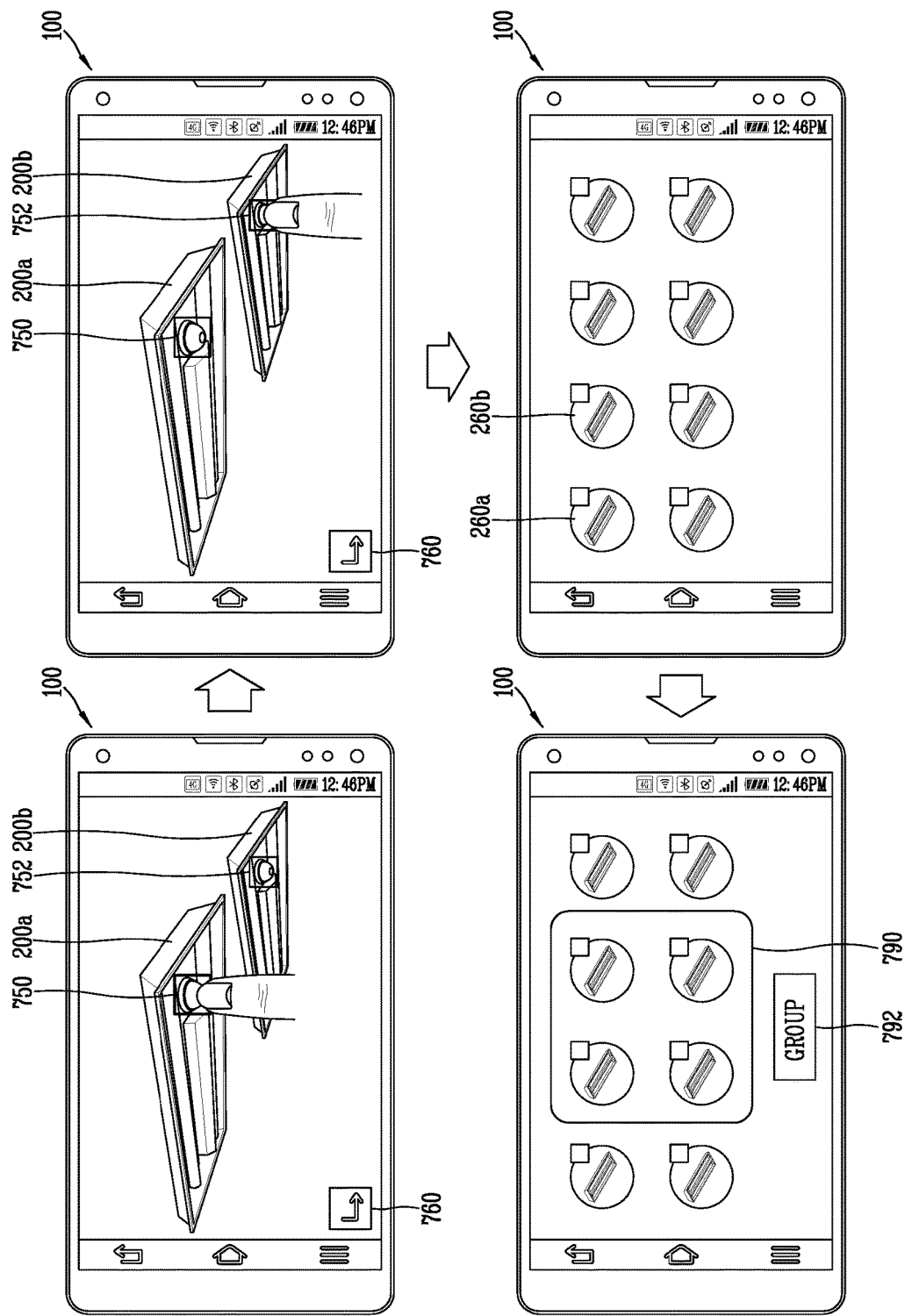

MOBILE TERMINAL AND CONTROL METHOD THEREFOR

CROSS REFERENCE TO RELATED APPLICATIONS

This application is the National Phase of PCT International Application No. PCT/KR2015/012271, filed on Nov. 16, 2015, which claims priority under 35 U.S.C. 119(a) to Patent Application No. 10-2015-0084451, filed in Republic of Korea on Jun. 15, 2015, all of which are hereby expressly incorporated by reference into the present application.

TECHNICAL FIELD

The present invention relates to a mobile terminal for controlling other devices and a control method thereof.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the mobile terminal becomes multifunctional, it is implemented as a multimedia player having complicated functions such as capturing images or videos, playing music or videos, playing games, and receiving broadcastings.

With the advancement of Internet of things (IoT), current mobile terminals can be used for more various purposes. For example, the current mobile terminals may wirelessly transmit a control signal to another device to control the other device. Due to such a function, a user can conveniently control various home appliances such as a lighting device, an air conditioner, and a television (TV) by using a mobile terminal even without a remote controller for controlling a corresponding device. Also, various methods which enable a mobile terminal to more conveniently and easily control a plurality of home appliances are being actively researched at present.

SUMMARY OF THE INVENTION

The present invention is for the purpose of solving the above-described problems and is to provide a mobile terminal and a control method thereof, which enable a user to more easily and conveniently control a plurality of lighting devices.

The present invention is to provide a mobile terminal and a control method thereof, which can more easily register and control a lighting device, which is to be controlled by a user, of a plurality of lighting devices.

According to one aspect of the present invention for achieving another object, a mobile terminal according to an embodiment of the present invention includes a wireless communicator exchanging a wireless signal with a plurality of lighting devices and a controller transmitting a control signal to at least some of the plurality of lighting devices when identification information about each of the plurality of lighting devices is received through the wireless communicator, for simultaneously controlling the at least some lighting devices, wherein based on information obtained through the mobile terminal or a separate device, the identification information is received in response to a request of the mobile terminal transmitted to at least some of lighting devices installed in a specific indoor region, or when the mobile terminal satisfies a predetermined condition, the identification information is transmitted from at least some lighting devices pre-selected by a predetermined manner from among the lighting devices installed in the specific indoor region.

In an embodiment, the mobile terminal further includes a display unit displaying a graphic object corresponding to each of the plurality of lighting devices.

In an embodiment, the identification information further includes information related to a position of each of the plurality of lighting devices, and the mobile terminal calculates the position of each of the plurality of lighting devices, based on the position-related information included in the identification information and determines positions of graphic objects displayed on the display unit, based on the calculated position.

In an embodiment, the information related to the position of each of the plurality of lighting devices is information about a relative position of each of the plurality of lighting devices calculated by a predetermined separate position tracker.

In an embodiment, the information related to the position of each of the plurality of lighting devices is information about where the relative position of each of the plurality of lighting devices calculated by the position tracker is matched with drawing information corresponding to the specific indoor region.

In an embodiment, the controller generates a group including at least one graphic objects, based on an input of a user applied to the display unit, and when a control command for the generated group is selected, the controller controls the wireless communicator so that a control signal corresponding to the selected control command is simultaneously transmitted to lighting devices corresponding to the graphic objects of the group.

In an embodiment, the input of the user is a trajectory of a touch and drag input of the user applied to the display unit, and the group is generated based on a closed curve generated based on the touch and drag input.

In an embodiment, the lighting devices installed in the specific indoor region include at least one infrared sensor for sensing an infrared signal and at least one photo sensor for sensing a light signal having a predetermined pattern, and the plurality of lighting devices are some lighting devices which are selected from among the lighting devices installed in the specific indoor region, based on the infrared signal or the light signal transmitted from the mobile terminal or a predetermined separate device.

In an embodiment, the lighting devices installed in the specific indoor region transmit a predetermined signal in a specific direction, and the mobile terminal senses a signal transmitted from at least one of the lighting devices installed in the specific indoor region and receives the identification information from lighting devices corresponding to the sensed signal.

In an embodiment, each of the lighting devices installed in the specific indoor region has a code which corresponds to predetermined information and is exposed to at least a portion of an external appearance thereof, and the mobile terminal recognizes the exposed at least one code through a predetermined separate device and receives the identification information from at least one lighting device corresponding to a result of the recognition.

In an embodiment, the mobile terminal further includes a camera receiving an image, wherein when an image including at least some of the lighting devices installed in the specific indoor region is received from the camera, the controller receives the identification information from the at least some of the lighting devices installed in the specific indoor region, based on an input of a user for the image.

In an embodiment, the controller allows at least one specific region corresponding to the lighting devices to be displayed distinguishably from the image received from the camera and selects lighting devices, from which the identification information is to be requested, in the at least one specific region, based on a sensed input of a user.

In an embodiment, the mobile terminal is a dangle type device connected to another device.

In an embodiment, the mobile terminal transmits graphic objects respectively corresponding to the plurality of lighting devices and position information based on a relative position of each of the plurality of lighting devices to the other device, and the other device displays the graphic objects respectively corresponding to the plurality of lighting devices on a display unit, based on the graphic objects and the position information transmitted from the mobile terminal.

According to one aspect of the present invention for achieving another object, a control method of a mobile terminal according to an embodiment of the present invention includes searching for a controllable lighting device, based on identification information received from a plurality of lighting devices, displaying graphic objects corresponding to the found at least one lighting devices, generating a group including at least one graphic objects, based on an input of a user for the displayed graphic objects, and when there is a control command of the user for the generated group, transmitting a control signal corresponding to the control command to lighting devices respectively corresponding to the graphic objects included in the group, wherein based on information obtained through the mobile terminal or a separate device, the identification information is received in response to a request of the mobile terminal transmitted to at least some of lighting devices installed in a specific indoor region, or when the mobile terminal satisfies a predetermined condition, the identification information is transmitted from at least some lighting devices pre-selected by a predetermined manner from among the lighting devices installed in the specific indoor region.

Advantageous Effects

Effects of a mobile terminal and a control method thereof according to the present invention will be described below.

According to at least one of embodiments of the present invention, the present invention allows only a lighting device, selected by a predetermined manner, of a plurality of lighting devices to be registered, and thus, has an effect where a user can more easily and conveniently search for and control lighting devices which are to be controlled by the user.

Moreover, according to at least one of embodiments of the present invention, the present invention enables a user to arbitrarily group and manage pre-registered lighting devices, and thus, has an effect where the user can more easily and conveniently control a plurality of lighting devices simultaneously.

BRIEF DESCRIPTION OF THE DRAWINGS

FIG. 1 is a block diagram for describing a mobile terminal relevant to the present invention.

FIGS. 7A to 7E are exemplary diagrams illustrating examples of registering lighting devices selected by a user according to an embodiment of the present invention.

DETAILED DESCRIPTION OF THE EMBODIMENTS

Figure 2A:
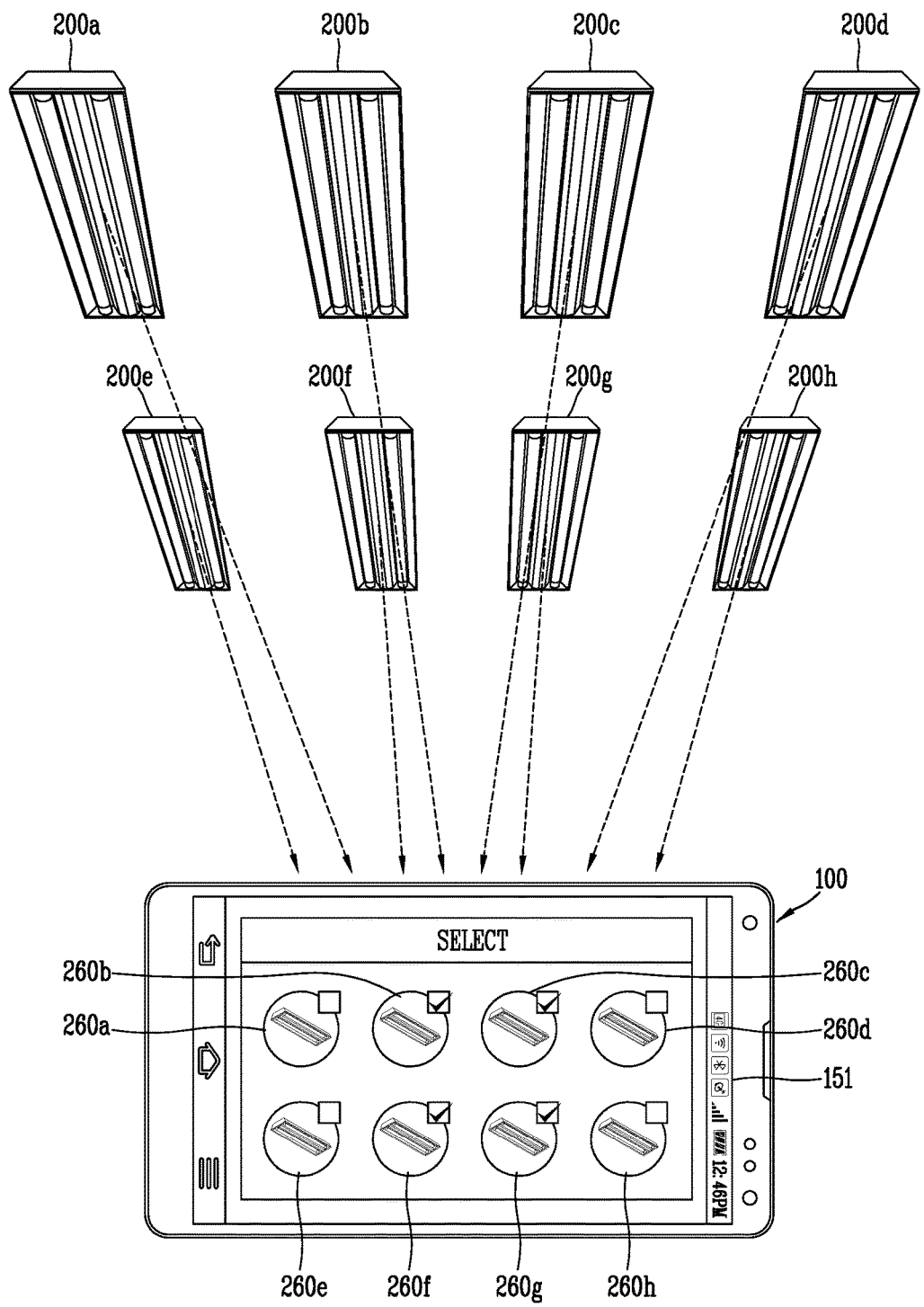
FIG. 2A is an exemplary diagram illustrating an example where a plurality of lighting devices are registered for control according to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal 100 in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

The controller 180 controls some or all of the components illustrated in FIG. 1 in order to drive an application program stored in the memory 170. Further, the controller 180 may operate at least two of the components of the mobile terminal 100 in order to drive the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a mobile terminal 100 according to various embodiments to be explained later. The operation or the control method for the mobile terminal may be implemented on the mobile terminal by driving at least one application program stored in the memory 170.

Before explaining various embodiments of the mobile terminal 100, the aforementioned components will be explained in more detail with reference to FIG. 1.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE) LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

The controller 180 of the mobile terminal 100 according to an embodiment of the present invention may be wirelessly connected to a plurality of lighting devices and may control at least some of the connected plurality of lighting devices. To this end, the controller 180 may receive registration information from lighting devices selected based on a predetermined manner, or may receive registration information from each of a plurality of lighting devices and may register some of the lighting devices according to a selection of a user.

Figure 2B:
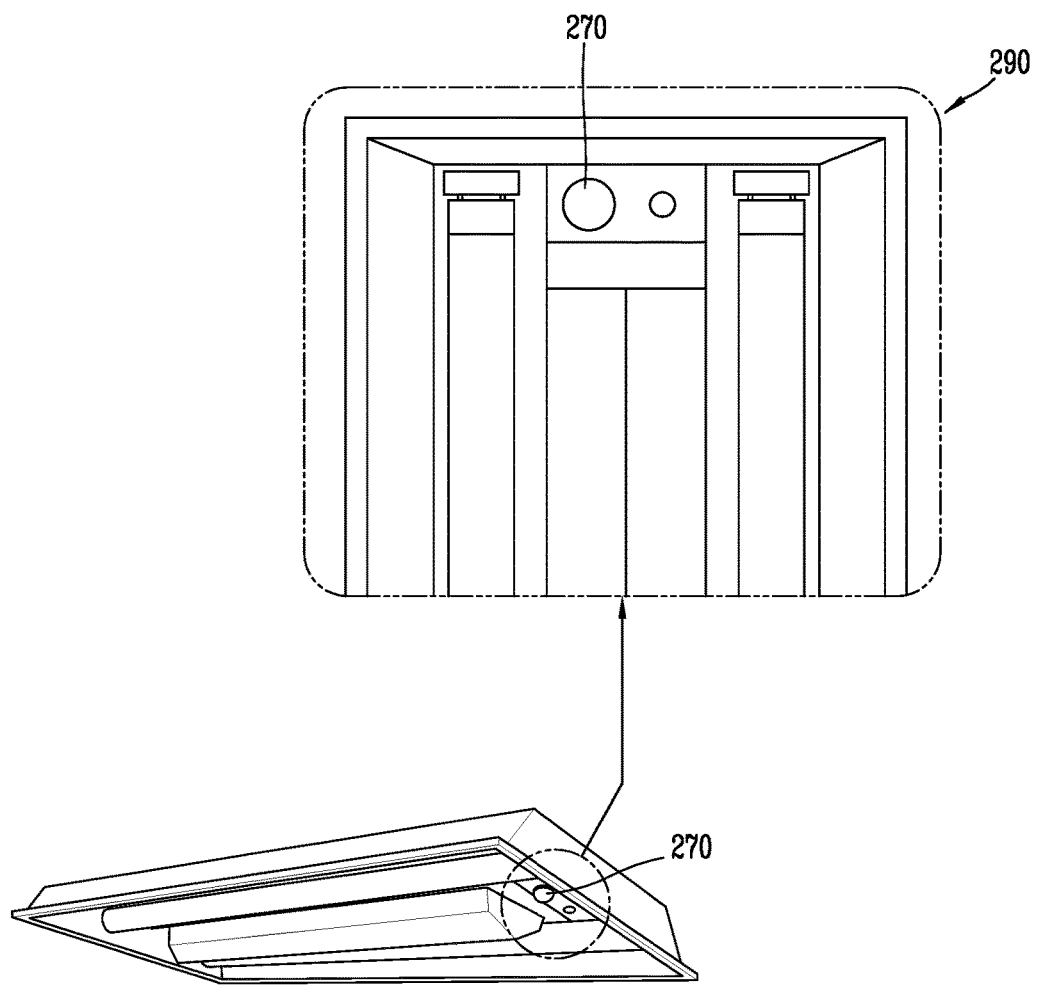
FIG. 2B is an exemplary diagram illustrating an example of a lighting device according to an embodiment of the present invention.

FIG. 2A is an exemplary diagram illustrating an example where a plurality of lighting devices are registered for control according to an embodiment of the present invention. Also, FIG. 2B is an exemplary diagram illustrating an example of a lighting device according to an embodiment of the present invention.

First, as illustrated in FIG. 2A, when an operation according to an embodiment of the present invention is performed, or when the mobile terminal 100 enters a predetermined region, the mobile terminal 100 may search for a plurality of lighting devices 200a to 200e corresponding to a current position. For example, such a search process may include a process where when the mobile terminal 100 is sensed, a signal transceiver included in each of the plurality of lighting devices 200a to 200e transmits a predetermined signal to the mobile terminal 100, or when a search signal transmitted from the mobile terminal 100 is received, or when a selection is made based on a predetermined selection manner, the signal transceiver of each of the plurality of lighting devices 200a to 200e transmits a response signal.

To this end, the plurality of lighting devices 200a to 200e may each include a signal transceiver 270. The signal transceiver 270, as illustrated in FIG. 2B, may be implemented as a type where at least a portion of the signal transceiver 270 protrudes to the outside of a lighting device, and may include a signal transmitter (not shown) for transmitting a signal for registering a specific lighting device to the mobile terminal 100 and a signal receiver (not shown) for receiving a control signal from the mobile terminal 100. Furthermore, the signal transceiver 270 may include various sensors such as an IR sensor or an illumination sensor, and thus, may sense an IR signal or a light signal having a predetermined pattern. Here, the IR signal or the light signal having the predetermined pattern may be used to determine whether a corresponding lighting device is selected by a user.

When a predetermined signal is received from the plurality of lighting devices 200a to 200e, the controller 180 of the mobile terminal 100 may display information, corresponding to lighting devices corresponding to the received signal, on the display unit 151. That is, as illustrated in FIG. 2A, the controller 180 may display a graphic objects 260a to 260e respectively corresponding to the plurality of lighting devices 200a to 200e on the display unit 151, and various operations may be performed based on an input of the user applied to the display unit 151.

For example, the controller 180 may control turn-on/off of a lighting device corresponding to a specific graphic object, based on the input of the user. Alternatively, when a specific lighting device is selected by the user, the controller 180 may perform an illumination or turn-on/off reservation function on a corresponding lighting device. Also, in addition to controlling one specific lighting device, a plurality of lighting devices may be simultaneously controlled together.

To this end, based on an input of the user for some of the displayed lighting devices, the controller 180 may set (group) a group of the some lighting devices. In this case, lighting devices set as the same group may be simultaneously controlled together, and thus, the user can more easily and conveniently control a plurality of lighting devices.

Figure 2C:
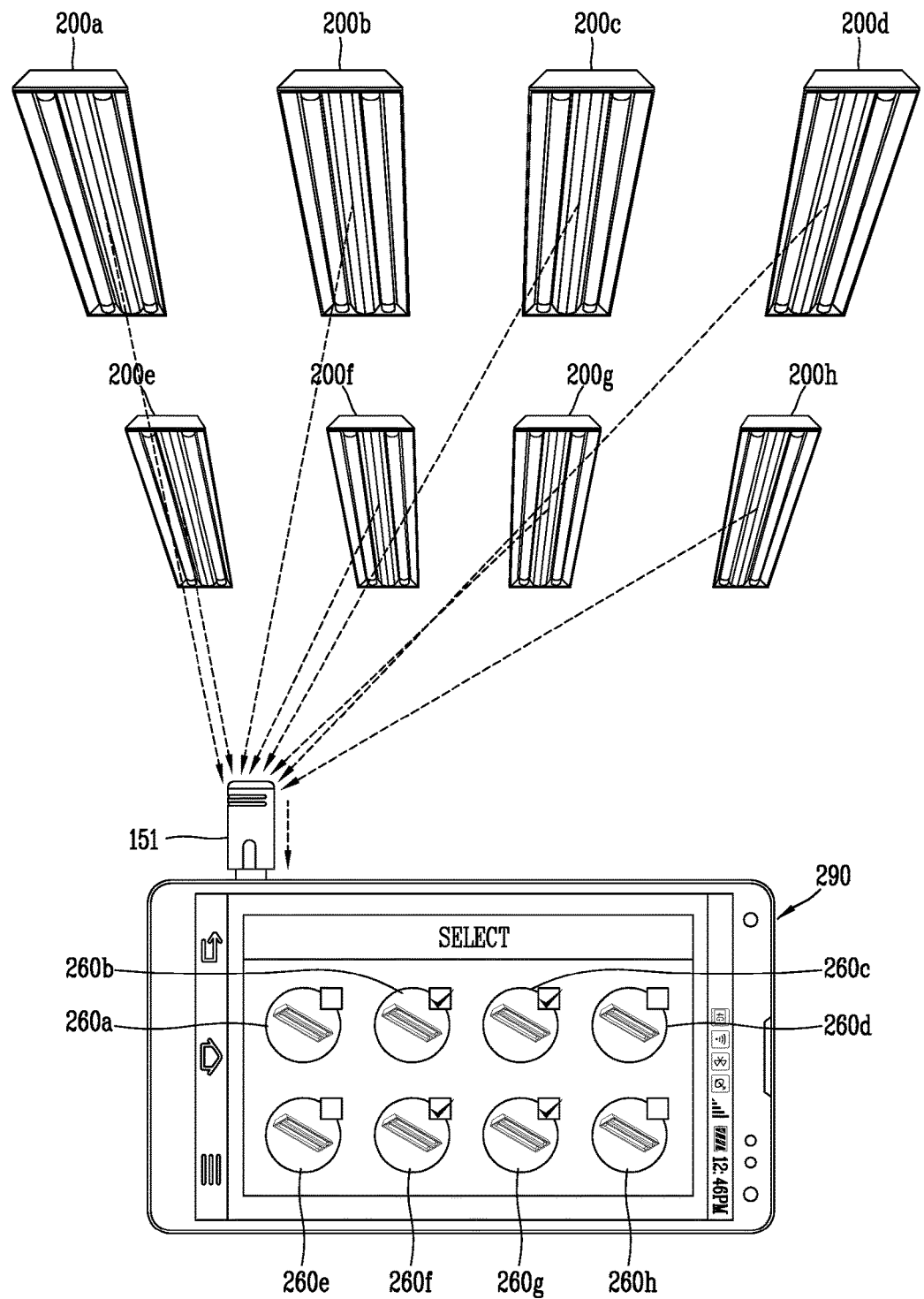
FIG. 2C is an exemplary diagram illustrating an example of a dongle type mobile terminal relevant to the present invention.

The mobile terminal 100 according to an embodiment of the present invention may be implemented as a dongle type which is connectable to other terminals such as smartphones, notebook personal computers (PCs), tablet PCs, etc. FIG. 2C illustrates such an example.

To provide description with reference to FIG. 2C, a dongle type mobile terminal 100 according to an embodiment of the present invention may transmit information about a plurality of found lighting devices to another device 290. In this case, the information about the plurality of lighting devices may be graphic objects respectively corresponding to the plurality of lighting devices, and if the lighting devices include pre-grouped lighting devices, the information may include information about a grouped state. Therefore, as illustrated in FIG. 2C, the graphic objects respectively corresponding to the lighting devices may be displayed on a display unit of the other device 290.

In this state, when there is an input of the user for at least one of the graphic objects displayed in the other device 290, a controller 18Q of the other device 290 may transmit information about the lighting devices corresponding to the input of the user and control information based on the input of the user to the dongle type mobile terminal 100. Then, the mobile terminal 100 may transmit a control signal for control to at least one lighting device corresponding to the input of the user according to the transmitted control information. Then, a signal transceiver 270 included in a corresponding lighting device may receive the transmitted control signal and may allow a lighting device to be controlled according to the control signal.

Hereinafter, various embodiments may be implemented in, for example, a recording medium readable by a computer or a device similar thereto by using software, hardware, or a combination thereof.

Hereinafter, embodiments relevant to a control method capable of being implemented in a mobile terminal configured as described above will be described with reference to the accompanying drawings. It is obvious to those skilled in the art that the present invention can be embodied as anther specific type without departing from the scope and essential feature of the present invention.

Figure 3:
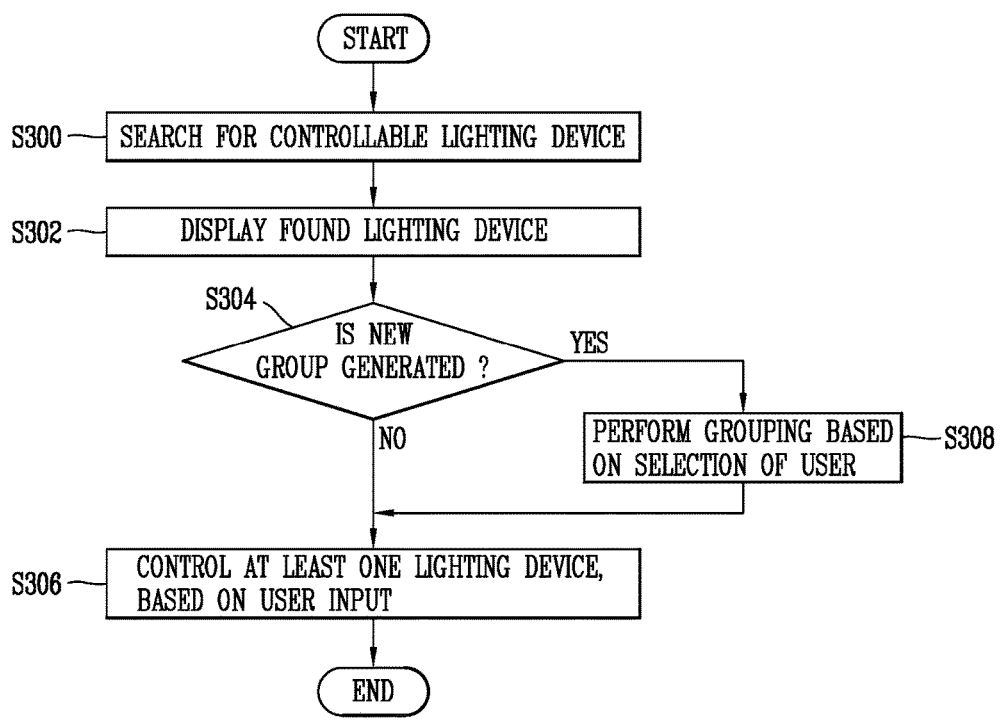
FIG. 3 is a flowchart illustrating an operation process of controlling at least one lighting device by using a mobile terminal according to an embodiment of the present invention.

First, FIG. 3 is a flowchart illustrating an operation process of controlling at least one lighting device by using a mobile terminal according to an embodiment of the present invention.

To provide description with reference to FIG. 3, when a predetermined condition is satisfied, the mobile terminal 100 according to an embodiment of the present invention may search for controllable lighting devices among lighting devices installed in a certain region corresponding to a current position of the mobile terminal 100 in operation S300. For example, when a function (i.e., a function for controlling a plurality of lighting devices) according to an embodiment of the present invention starts, the controller 180 may search for controllable lighting devices among ambient lighting devices. Alternatively, when the controller 180 senses entry into an indoor specific region, the controller 180 may automatically search for controllable lighting devices among lighting devices provided in a corresponding indoor region. Here, the controllable lighting devices may be all of a plurality of lighting devices found at the current position of the mobile terminal 100, or may be some lighting devices, pre-selected by the user, of the plurality of lighting devices.

For example, when the search starts, the plurality of lighting devices (signal transceivers included in the respective lighting devices) may transmit a response signal to a search signal transmitted from the mobile terminal 100. In this case, the mobile terminal 100 may receive a response signal received from all of the plurality of lighting devices, and all of the plurality of lighting devices may be found as controllable lighting devices.

Only when the plurality of lighting devices are pre-selected by the user, the plurality of lighting devices may transmit the response signal. For example, the selection of the plurality of lighting devices may be determined based on whether a lighting device having a predetermined pattern is sensed based on a sensing result of the illumination sensor or whether an IR signal transmitted from the mobile terminal 100 is sensed based on a sensing result of the IR sensor. Also, only when the selection is made, the plurality of lighting devices may transmit the response signal corresponding to the search signal to the mobile terminal 100.

The selection of the controllable lighting devices may be performed by various manners in addition to the above-described manners. For example, the controller 180 of the mobile terminal 100 may receive information about a specific lighting device from a predetermined selection device and may detect only a lighting device, corresponding to the received information, as a controllable lighting device. For example, each of the plurality of lighting devices may be provided so that a unique information tag or a unique information code including its own unique information is exposed to at least a portion of an external appearance, and the predetermined selection device may scan the unique information tag or code and may transmit a scan result to the mobile terminal 100. In this case, the scan result may be unique information about a specific lighting device, and the controller 180 may detect, as a controllable lighting device, only a lighting device, corresponding to the unique information received from the selection device, of the plurality of lighting devices which have transmitted the response signal corresponding to the search signal.

An example of searching for controllable lighting devices in various manners and displaying information about lighting devices based on a search result on the display unit 151 will be described below in more detail with reference to FIGS. 7A to 7E.

When the controllable lighting devices are found, the controller 180 may display graphic objects, respectively corresponding to the found lighting devices, on the display unit 151. Here, if the mobile terminal 150 according to an embodiment of the present invention is implemented as a type which is connectable to another terminal in a dongle type, the controller 180 may transmit information about the graphic objects and positions, at which the graphic objects are displayed, to the other terminal connected thereto.

The graphic objects may be displayed in various forms. For example, the graphic objects may be displayed based on current relative positions of the mobile terminal 100 and lighting devices. Here, position information about the lighting devices may be received from a specific device provided in each of indoor certain regions, or positions of the lighting devices may be determined based on relative position information calculated between the lighting devices.

Moreover, graphic objects corresponding to positions of the determined lighting devices may be displayed based on a position of the mobile terminal 100, a gripped state of the mobile terminal 10Q, or a state where the mobile terminal is located. An operation process where graphic objects corresponding to respective lighting devices are displayed based on the position of the mobile terminal 100, the gripped state of the mobile terminal 100, or a direction corresponding to the state where the mobile terminal is located will be described below in more detail with reference to FIG. 4.

In operation S302, the controller 180 may check whether there is a lighting device pre-registered as a specific group. Also, based on a result of the check, pre-registered lighting devices and unregistered lighting devices of the found controllable lighting devices may be differentiated from each other and displayed.

When the found lighting devices are displayed, the controller 180 may sense whether to generate a new group in operation S304. Also, when generation of the new group is selected as a result of the sensing in operation S304, the controller 180 may generate a group including at least one of the graphic objects displayed on the display unit 151 according to a selection of the user in operation S308. In operation S308, the group may be generated based on the selection of the user for at least one of the found lighting devices. Also, the selection of the user may be performed in various manners.

For example, the controller 180 may sense the selection of the user, based on a touch input of the user applied to a region on which each of the graphic objects is displayed. Alternatively, the controller 180 may determine that the selection of the user has been performed on at least one graphic object, based on a trajectory of a touch and drag input applied to the display unit 151. That is, when the trajectory of the touch and drag input forms a closed curve on the display unit 151, the controller 180 may determine that graphic objects provided in the closed curve are selected as one group by the user. An example where at least one graphic object is selected based on the touch and drag input of the user will be described below in more detail with reference to FIG. 8.

When the generation of the new group is not selected in operation S304, or when the new group is selected, the controller 180 may allow lighting devices included in the generated group and other lighting devices to be differentiated from each other and displayed. Also, in this state, the controller 180 may allow at least one lighting device to be controlled based on an input of the user in operation S306.

In operation S306, the controller 180 may sense an input of the user for a graphic object corresponding to a specific lighting device. The input of the user may be associated with the illumination control or on/off of the specific lighting device. Alternatively, the input of the user may be associated with an on/off reservation of a corresponding lighting device.

The input of the user may not be associated with one specific lighting device. That is, when the user selects a specific group, a plurality of lighting devices included a corresponding group may be simultaneously selected, and in this state, when the user applies an input associated with illumination control, reservation of on/off, or control of on/off, this may be an input for controlling each of the lighting devices included in the group. Therefore, the controller 180 may transmit a control signal corresponding to the input to each of lighting devices included in a corresponding group.

Figure 4:
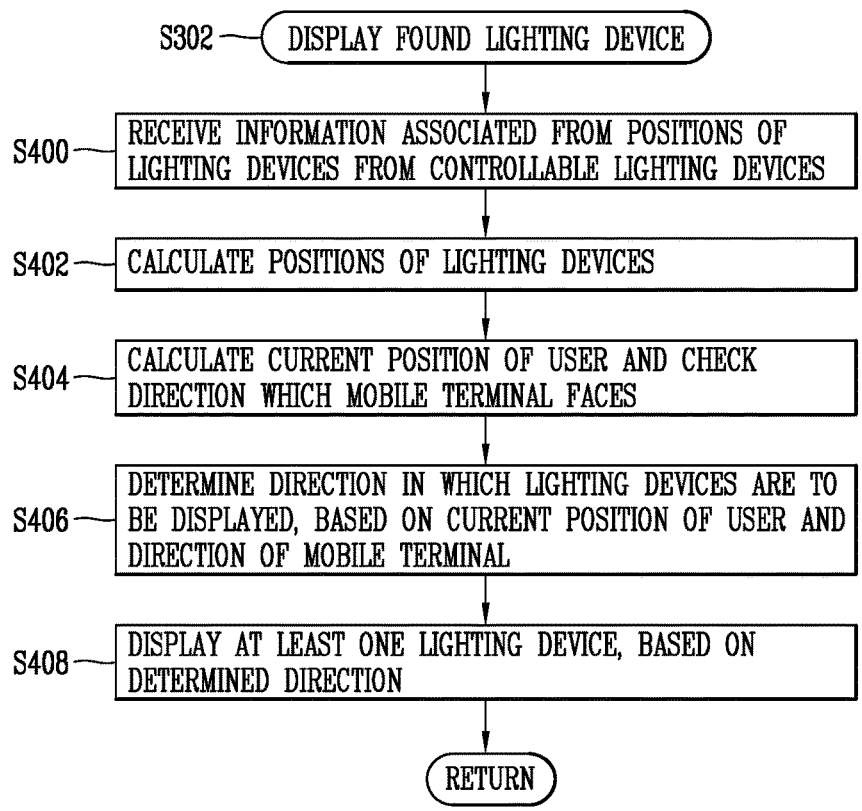
FIG. 4 is a flowchart illustrating an operation process of displaying found controllable lighting devices on a mobile terminal among operation processes of FIG. 3.

FIG. 4 is a flowchart illustrating an operation process of displaying found controllable lighting devices on a mobile terminal among operation processes of FIG. 3.

To provide description with reference to FIG. 4, when at least one lighting device is found as controllable, the controller 180 of the mobile terminal 100 according to an embodiment of the present invention may receive information associated with positions of corresponding lighting devices from the found controllable lighting devices in operation S400. Also, the controller 180 may calculate the positions of the lighting devices, based on the received information.

For example, the position-related information which is received from each of the lighting devices in operation S400 may include unique information about each lighting device, for example, identification information such as identification (ID). Then, in operation S402, the controller 180 may determine relative positions of the lighting devices by using various methods. Also, a method of determining the relative positions of the lighting devices may be a method using an intensity of a signal received from each of the lighting devices.

The position information about the lighting devices may be calculated by using a separate position tracker. In this case, operation S402 may be an operation of receiving the position information about the lighting devices calculated by the position tracker. The position tracker may calculate positions of the respective lighting devices, based on signals received from the signal transceivers 270 respectively included in the lighting devices, and the received signals may include unique information about each of the lighting devices. Then, the position tracker may match the calculated position of the respective lighting devices with unique information about the respective lighting devices to generate the position information (for example, coordinate information) about the respective lighting devices. The position tracker may be configured a separate device, or a device such as a wireless sharer or an access point (AP) may perform a function of the position tracker.

The position tracker may further include drawing information corresponding to a specific indoor region. In this case, the position tracker may match the generated position information for each of lighting devices with the pre-stored drawing information. Then, the position tracker may generate the drawing information including the position of each of the lighting devices, and when the controller 180 of the mobile terminal 100 requests the drawing information, the drawing information may be provided in operation S402.

When the position information about each of the lighting devices is obtained in operation S402, the controller 180 may check a current user, namely, a direction based on a position of the mobile terminal 100 and a gripped state or a located state of the mobile terminal 100 in operation S404.

For example, the controller 180 may estimate a relative position of the mobile terminal 100 with respect to the lighting devices, based on the position information about the lighting devices calculated in operation S402 and intensities of the signals received from the lighting devices.

Moreover, the controller 180 may check a direction based on a state of the mobile terminal 100. For example, the controller 100 may recognize a direction which a point predetermined in the mobile terminal 100 faces, based on the located state or the gripped state of the mobile terminal 100. For example, the point may be a part in which a speaker or a microphone of the mobile terminal 100 is provided. Also, a direction which the mobile terminal 100 faces may be checked based on a result obtained by comparing a direction, which the point faces from a center of the mobile terminal 100, with a direction which faces a predetermined reference point (for example, the wireless sharer, the AP, or the position tracker) from the mobile terminal 100.

When the position of the mobile terminal 100 and a direction which the mobile terminal faces are checked, the controller 180 may determine a direction in which the lighting devices are to be displayed, based on a current position of the user and a direction which the mobile terminal 100 faces in operation S406. Also, based on the determined direction, the controller 180 may determine positions at which the lighting devices are to be displayed, and may allow the respective lighting devices to be displayed at the determined positions in operation S408.

Figure 5A:
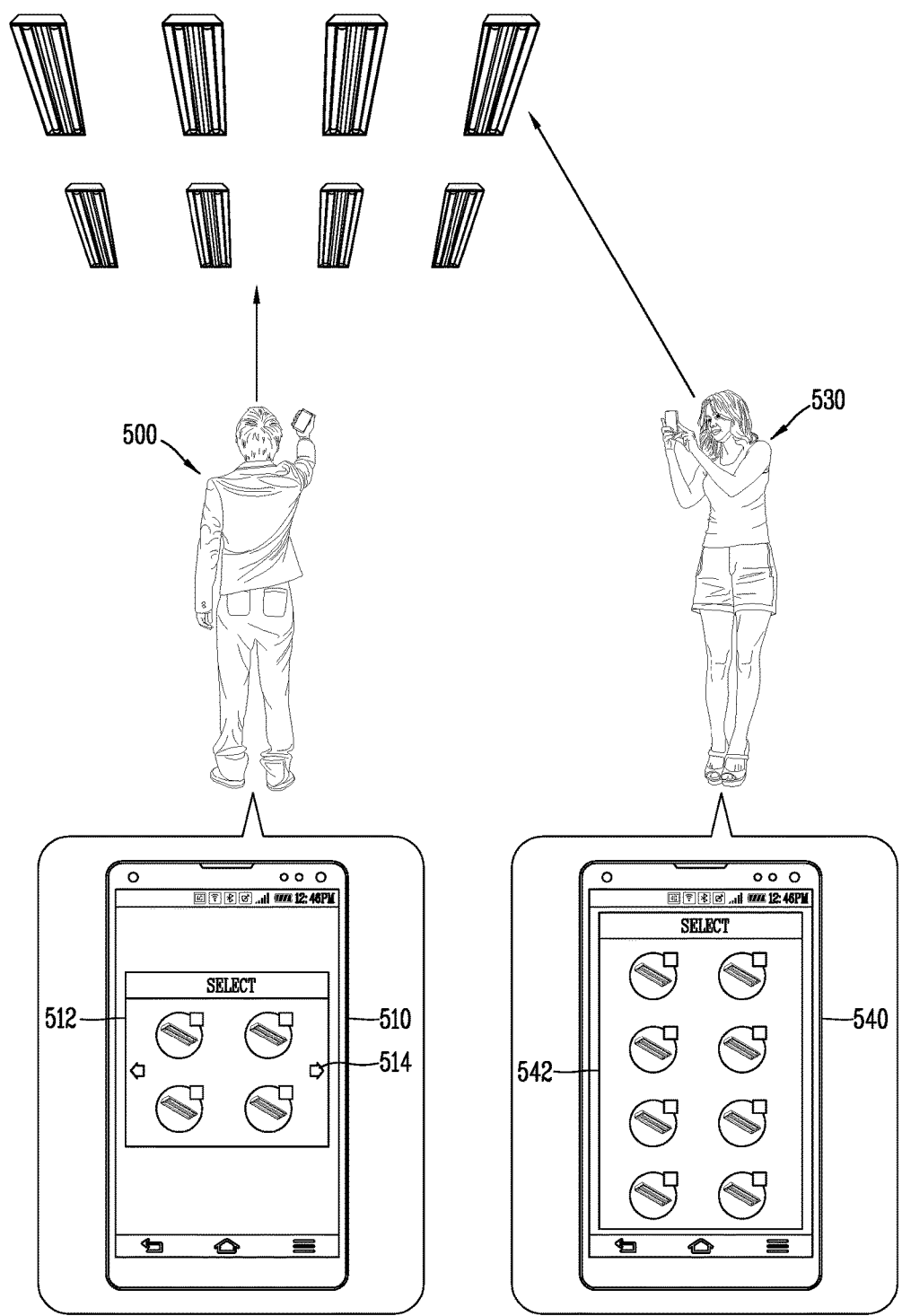
FIGS. 5A and 5B are exemplary diagrams illustrating examples where a plurality of lighting devices are displayed based on a direction in which a user is located according to the operation process of FIG. 4.
Figure 5B:
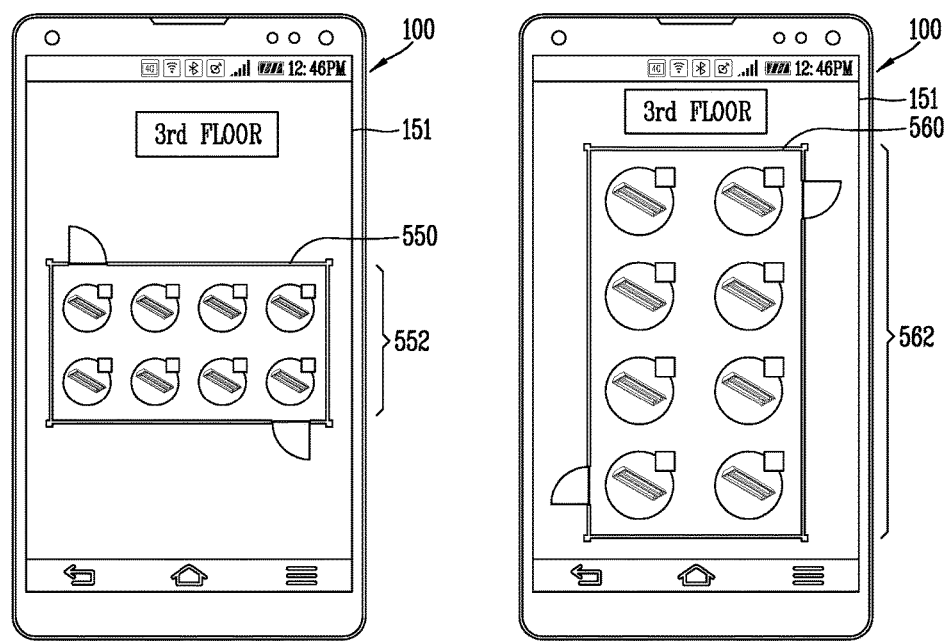

FIGS. 5A and 5B are exemplary diagrams illustrating examples where a plurality of lighting devices are displayed based on a direction in which a user is located according to the operation process of FIG. 4.

To provide description with reference to FIG. 5A, first, FIG. 5A illustrates an example of users who are located in an indoor region and are looking at lighting devices in different directions. In description below, a direction in which a first user 500 looks at lighting devices is referred to as a first direction, and a direction in which a second user looks at lighting devices is referred to as a second direction.

To describe a case of the first user, in the second direction in which the first user 500 looks at lighting devices, the lighting devices may be seen in a two rows, four columns form. In this case, a mobile terminal 510 of the first user 500 may recognize a position of the first user 500 and a direction in which the mobile terminal 510 faces, and may display positions of the lighting devices on a display unit 512. The mobile terminal 510 of the first user 500 may recognize a direction (i.e., the first direction) in which the first user 500 looks at the lighting devices, and thus, the lighting devices displayed on the display unit 512 may be displayed in a two rows, four columns form like a position and a direction in which the first user 500 looks at the lighting devices. Also, in this case, if all of graphic objects corresponding to the lighting devices are not displayed on the display unit 512, in order for a user to further select other lighting devices, at least one graphic object 514 may be displayed on the display unit 512 so that in addition to lighting devices corresponding to currently displayed graphic objects, graphic objects corresponding to other lighting devices are displayed.

When the lighting devices are seen from a position of the second user 530, the lighting devices may be shown in a four rows, two columns form in the second direction in which the second user 530 looks at the lighting devices, based on a position of the second user 530. In this case, the mobile terminal 540 of the second user 530 may recognize a direction (i.e., the second direction) in which the second user 530 looks at the lighting devices, based on a position of the mobile terminal 540 (a position of the second user 530) and a direction in which the mobile terminal 540 faces, and thus, the lighting devices displayed on a display unit 542 may be displayed in a four rows, two columns form like a position and a direction in which the second user 530 looks at the lighting devices.

In FIG. 5A, an example where graphic objects respectively corresponding to lighting devices are displayed based on a position of a user and a direction which a mobile terminal faces is illustrated. However, the graphic objects may be displayed in a form different from the illustration of FIG. 5A. For example, if the above-described position tracker includes drawing information, positions of the lighting devices may be displayed in match with drawing information corresponding to a space where lighting devices are currently installed. FIG. 5B illustrates an example where a position of a lighting devices matching drawing information is displayed on the display unit 151.

For example, the controller 180 may receive drawing information, corresponding to a current position (a 3rd floor) of a user (the mobile terminal 100), from a position tracker or a predetermined server, and may match the received drawing information with positions of lighting devices installed in an indoor space (for example, '3rd floor') where the user are currently located or may receive drawing information, including the positions of the lighting devices, from the position tracker or the predetermined server.

In this case, the first drawing and the second drawing of FIG. 5B illustrate an example where eight lighting devices are displayed in a two rows, four columns form or a four rows, two columns form according to a position of a user and a direction of a mobile terminal 100. For example, if a position of a user is a position of the first user 500 of FIG. 5A, the lighting devices may be displayed on the display unit 151 as illustrated in the first drawing of FIG. 5B, and if the position of the user is a position of the second user 530 of FIG. 5A, the lighting devices may be displayed on the display unit 151 as illustrated in the second drawing of FIG. 5B.

Only examples where lighting devices are seen from a specific side are described with reference to FIGS. 5A and 5B. However, the drawings of FIGS. 5A and 5B are merely an example of the present invention, and the present invention is not limited thereto. That is, the lighting devices may be displayed in a form as seen in another direction, based on a position of a user.

That is, in FIGS. 5A and 5B, in a case where it is assumed that an angle of a direction in which the user looks at the lighting devices is a reference angle (0 degrees) when the lighting devices are displayed in a two rows, four columns form, an angle of a direction in which the user looks at the lighting devices may be 90 degrees or 270 degrees when the lighting devices are displayed in a four rows, two columns form. In this state, when another user (a third user) is located between the first user 500 and the second user 530, graphic objects respectively corresponding to lighting devices may be displayed on a display unit of a mobile terminal of the third user with being inclined by 45 degrees as in FIG. 5A or 5B.

Figure 5C:
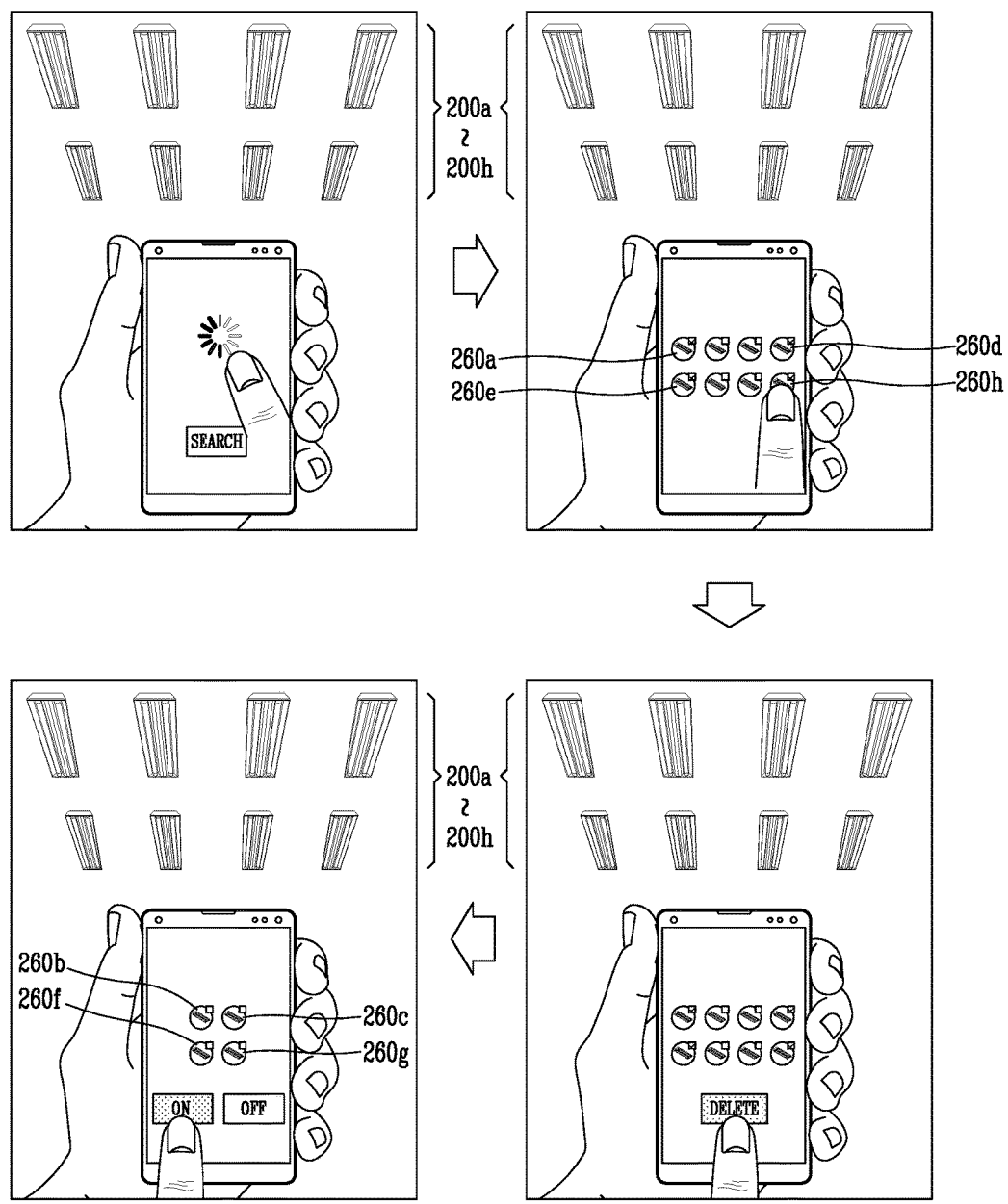
FIG. 5C is an exemplary diagram illustrating an example where a user removes arbitrary lighting devices from among lighting devices displayed according to an embodiment of the present invention.

According to the above description, graphic objects displayed on the display unit 151 may respectively correspond to lighting devices found as 'controllable lighting device'. Also, the 'controllable lighting device' may be all lighting devices capable of exchanging a signal with the mobile terminal 100 according to an embodiment of the present invention or capable of being controlled according to a control signal transmitted from the mobile terminal 100, or may be lighting devices which are pre-selected from among all the lighting devices by a user in various manners. Also, when controllable lighting devices are displayed on the display unit 151, the user may again select only lighting devices, which are to be controlled, from among the displayed lighting devices. FIG. 5C illustrates an example of this case.

To provide description with reference to FIG. 5C, the first drawing of FIG. 5C illustrates a search state where a mobile terminal 100 exchanges a signal with lighting devices 200a to 200h, searches for controllable lighting devices 200a to 200h, and receives information associated with positions of the found lighting devices. Also, when such a search process is completed, as illustrated in the second drawing of FIG. 5C, graphic objects 260a to 260h corresponding to the controllable lighting devices 200a to 200h may be displayed on the display unit 151.

In this state, the controller 180 may sense an input of a user for at least one of the graphic objects. For example, the controller 180 may sense a touch input of the user applied to a region, where at least one of graphic objects corresponding to found lighting devices is displayed, of the display unit 151 and may allow the graphic objects 260a, 260d, 260e, and 260h corresponding to the input to be displayed so as to the differentiated from the other graphic objects as illustrated in the second drawing of FIG. 5C.

In this manner, when at least one lighting devices are distinguishably displayed on the display unit 151, the controller 180 may display only some of the lighting devices as controllable lighting devices according to a selection of the user. That is, the controller 180 may display one of the distinguishably displayed lighting devices or undisplayed lighting devices as a controllable lighting device. For example, as illustrated in the third drawing of FIG. 5C, by using 'delete', the user may allow the distinguishably displayed lighting devices to be no longer displayed. In this case, as illustrated in the fourth drawing of FIG. 5C, only the graphic objects 260b, 260c, 260f, and 260g corresponding to some lighting devices may be displayed on the display unit 151, and only lighting devices corresponding to the graphic objects 260b, 260c, 260f, and 260g displayed on the display unit 151 may be controlled according to the control signal transmitted from the mobile terminal 100.

Figure 6A:
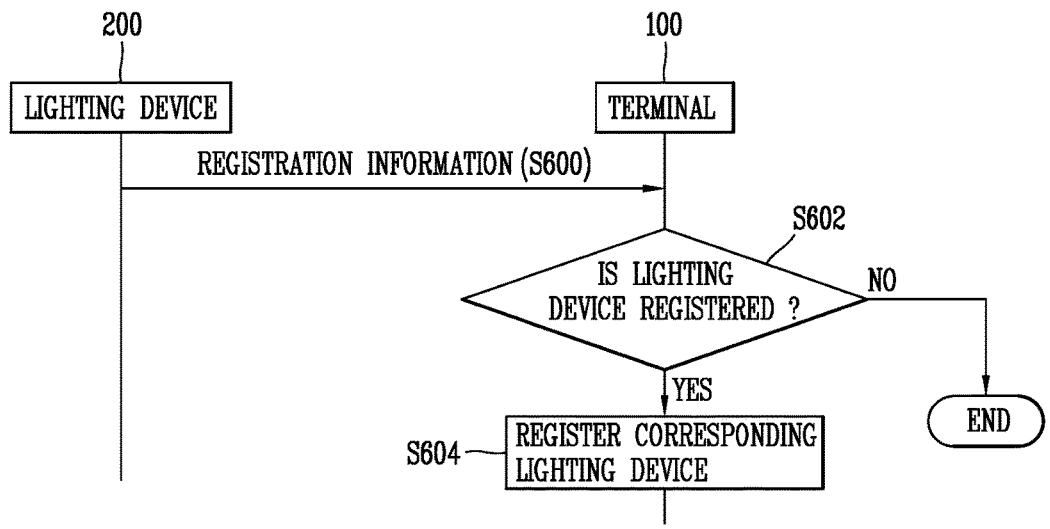
FIGS. 6A and 6B are flowcharts illustrating an example of an operation process of selecting a lighting device according to an embodiment of the present invention.
Figure 6B:
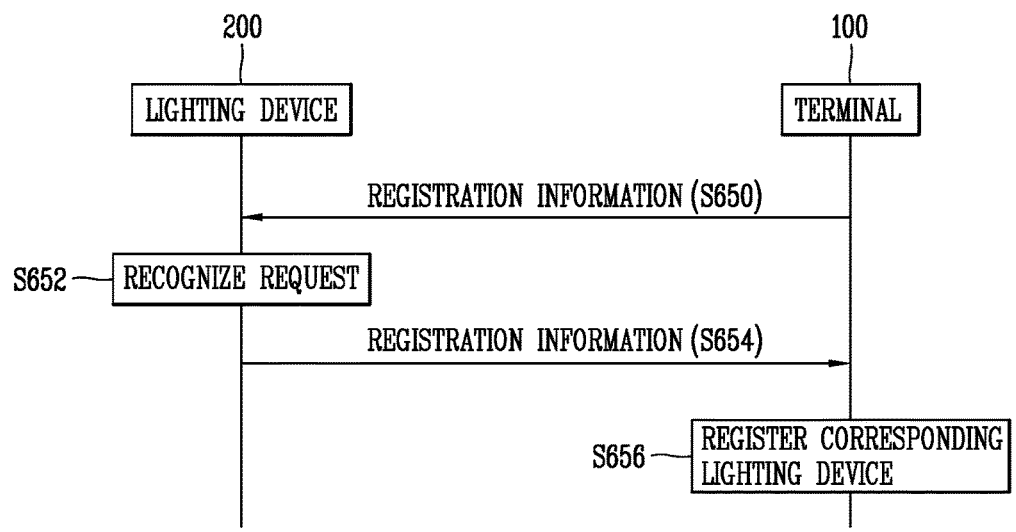

According to the above description, in FIG. 3, it has been described above that all lighting devices capable of being controlled according to the control signal of the mobile terminal 100 or lighting devices pre-selected from among the lighting devices according to a predetermined manner may be found in operation S300 of searching for controllable lighting devices. FIGS. 6A and 6B are flowcharts illustrating an example of an operation process of selecting a lighting device according to an embodiment of the present invention.

To provide description with reference to FIG. 6A, first, FIG. 6A illustrates an example of a case where registration information is first transmitted from controllable lighting devices. Here, the lighting devices may be lighting devices capable of exchanging a signal with the mobile terminal 100 according to an embodiment of the present invention and a control signal transmitted from the mobile terminal 100. Also, the lighting device 200 may be a lighting device which is pre-selected by a user in various manners. For example, the lighting device 200 may be a lighting device which is pre-selected based on a predetermined IR signal or a light signal having a predetermined pattern. In this case, only pre-selected lighting devices may transmit the registration information to the mobile terminal 100 in operation S600.

An example where lighting devices are pre-selected in various manners will be described below with reference to FIGS. 7A to 7C.

Each lighting device 200 may transmit the registration information to the mobile terminal 100 when a predetermined condition is satisfied. Here, the registration information Also, the predetermined condition may be various conditions such as a case where may be information which includes identification information such as ID and information associated with positions of the lighting devices. The mobile terminal 100 enters an indoor region where the lighting devices are installed or a case where an operation process according to an embodiment of the present invention starts in the mobile terminal 100.

Moreover, when the registration information is received from the lighting device 200, the controller 180 of the mobile terminal 100 may receive a selection of the user for determining whether to register a lighting device corresponding to the received registration information in operation S602. That is, as illustrated in FIG. 5C, the controller 180 may display only some of graphic objects, respectively corresponding to found controllable lighting devices, on the display unit 151 according to the selection of the user. Alternatively, the controller 180 may register (group) some of the displayed graphic objects in a specific group according to the selection of the user in operation S604. In this case, lighting devices included in each group may be simultaneously controlled according to an input of the user for a corresponding group.

Unlike the illustration of FIG. 6A, a specific lighting device 200 may be directly selected. That is, the lighting device may be pre-selected by various manners, for example, a predetermined IR signal or a light signal having a predetermined pattern, or a specific lighting device may be selected based on a result obtained by scanning a region where a unique information tag or code of the specific lighting device is provided. An example of various cases where a lighting device is selected will be described below in more detail with reference to FIGS. 7A to 7E.

In operation S650, when at least one specific lighting device is pre-selected, the controller 180 may request registration information from only the lighting devices which are pre-selected in operation S300 of FIG. 3. Then, the pre-selected lighting devices may recognize a request received from the mobile terminal 100 in operation S660, and may transmit its own registration information in response to the request in operation S654. Here, the registration information may include identification information about the pre-selected lighting device and information associated with a position of the pre-selected lighting device.

The controller 180 of the mobile terminal 100 may register the pre-selected lighting device, based on the received registration information in operation S656. Then, graphic objects corresponding to the registered lighting devices may be displayed as controllable lighting devices on the display unit 151 and may be grouped or controlled according to a selection of a user.

FIGS. 7A to 7E are exemplary diagrams illustrating examples of registering lighting devices selected by a user according to an embodiment of the present invention. However, the present invention is not limited to methods illustrated in FIGS. 7A to 7E, and a specific lighting device may be pre-selected by another method unillustrated in FIGS. 7A to 7E.

Figure 7A:
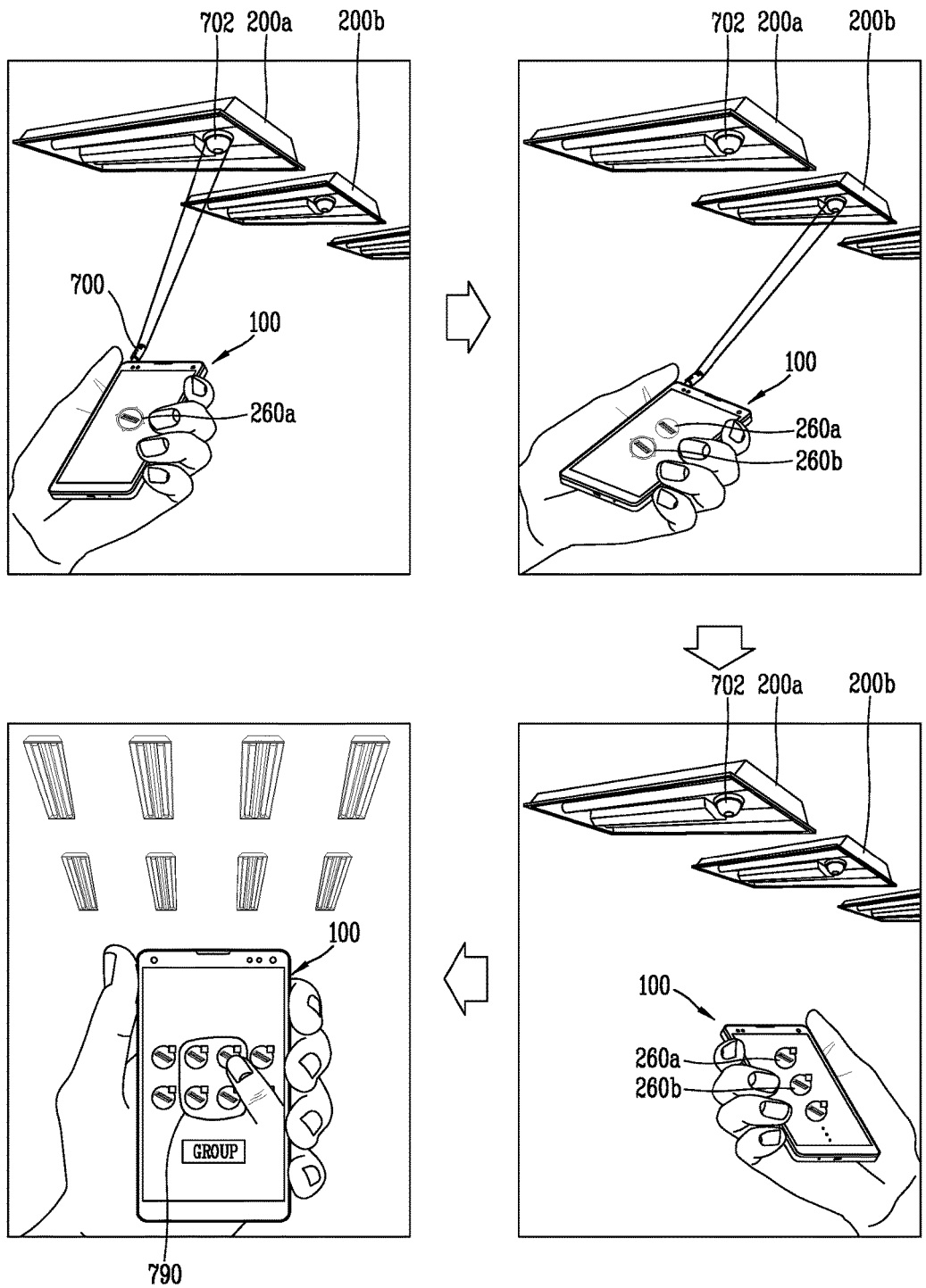

To provide description with reference to FIG. 7A, first, an example where specific lighting devices are pre-selected based on a predetermined signal is illustrated. Here, the predetermined signal may be an infrared (IR) signal, and the signal may be directly transmitted from the mobile terminal 100 to a specific lighting device.

First, as illustrated in the first drawing and the second drawing of FIG. 7A, the mobile terminal 100 may sequentially transmit an IR signal to at least one lighting devices 200a and 200b according to a selection of the user. Then, the lighting devices 200a and 200b may immediately transmit registration information in response to the transmitted IR signal, or may transmit the registration information to the mobile terminal 100 according to a predetermined condition, for example, a case where an operation process according to an embodiment of the present invention starts in the mobile terminal 100 (operation S300 of FIG. 3) or a case where the mobile terminal 100 enters a specific region.

When registration information is received from at least one lighting devices, the controller 180 may display graphic objects, respectively corresponding to the lighting devices 200a and 200b corresponding to the received registration information, on the display unit 151. Therefore, as illustrated in the second drawing of FIG. 7A, a first graphic object 260a corresponding to a first lighting device 200a and a second graphic object 260b corresponding to a second lighting device 200b may be displayed on the display unit. Also, such graphic objects may be sequentially displayed as illustrated in the third drawing of FIG. 7A.

In this manner, in graphic objects respectively corresponding to lighting devices, as illustrated in the four drawing of FIG. 7A, graphic objects corresponding to registered lighting devices may be displayed based on a position of the user and a direction which the mobile terminal 100 faces. In this state, as illustrated in the fourth drawing of FIG. 7A, the user may select at least one graphic objects and may generate the selected at least one graphic objects as one group 790 (operation S304 and operation S308 of FIG. 3). Also, lighting devices included in the same group 790 may be simultaneously controlled according to a selection of the user (operation S306 of FIG. 3). That is, lighting devices of the same group may be simultaneously turned on/off, or brightness (illumination) thereof may be identically controlled, or the same on/off reservation time may be set.

Figure 7B:
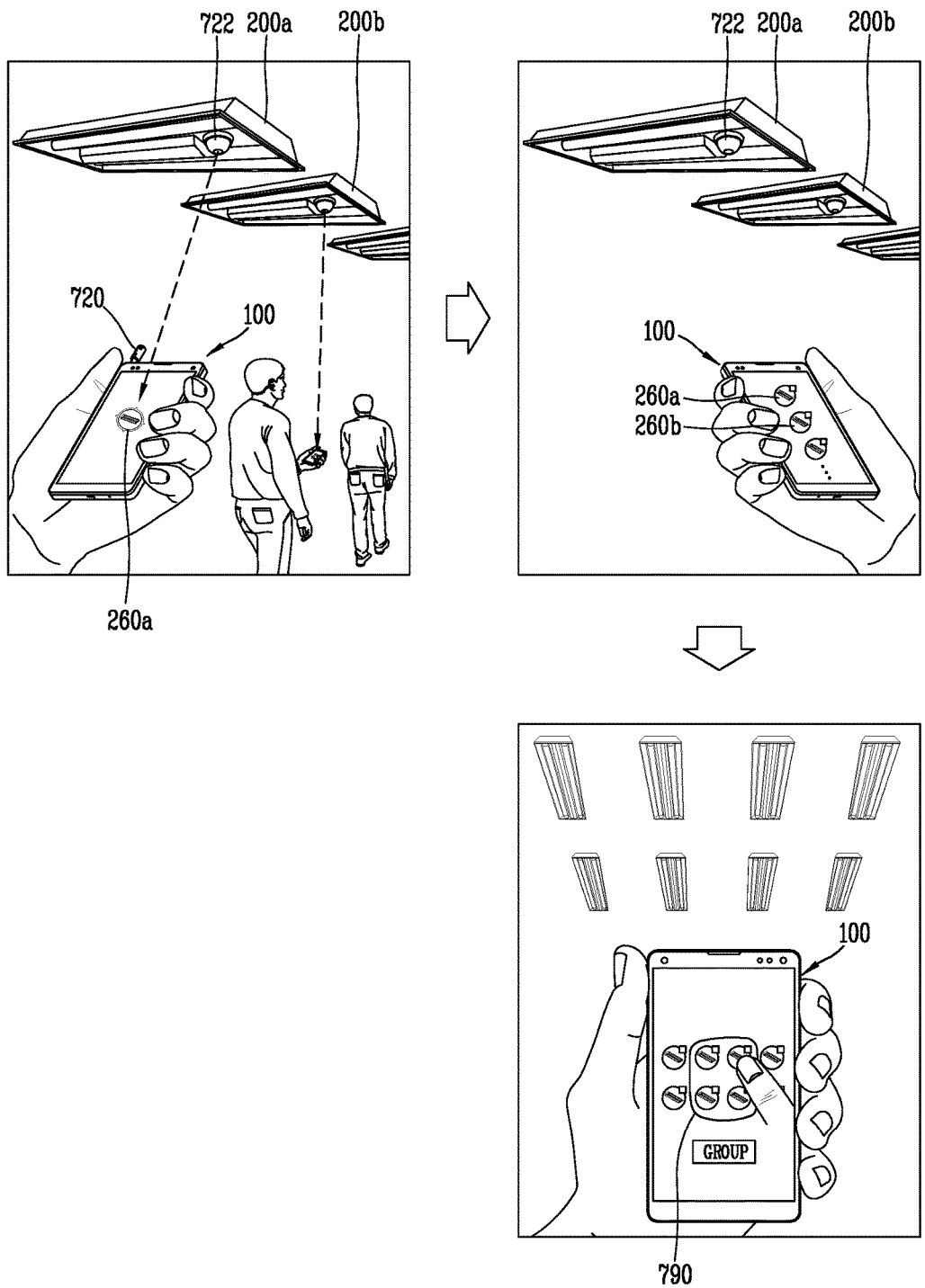

FIG. 7B illustrates an example where lighting devices are selected by another manner. For example, if FIG. 7A illustrates a case where a specific lighting device is selected based on an IR signal transmitted from the mobile terminal 100, FIG. 7B illustrates an example where an IR signal is transmitted from a lighting device, and the mobile terminal 100 which has sensed the transmitted IR signal selects a lighting device corresponding to the sensed IR signal.

That is, as illustrated in the first drawing of FIG. 7B, signal transceivers of lighting devices (for example, 200a to 200h) may transmit an IR signal in a specific direction (for example, a vertically down direction). In this state, as illustrated in the first drawing of FIG. 7B, when the user moves via points at which specific lighting devices (a first lighting device 200a and a second lighting device 200b) transmit an IR signal, the mobile terminal 100 of the user may sense the IR signal transmitted from the first lighting device 200a and the second lighting device 200b. Also, the controller 180 of the mobile terminal 100 may determine that the first lighting device 200a and the second lighting device 200b are selected, based on the sensed IR signal.

In this case, as illustrated in FIG. 7B, graphic objects corresponding to lighting devices corresponding to the IR signal may be displayed on a screen of the display unit 151 of the mobile terminal 100. Then, as illustrated in the third drawing of FIG. 7B, at least one graphic objects may be selected, and lighting devices corresponding to the selected graphic objects may be generated as one group (operation S304 and operation S308 of FIG. 3) or may be simultaneously controlled (operation S306 of FIG. 3).

According to the above description, it has been described above that signal transceivers of lighting devices according to an embodiment of the present invention may include an illumination sensor and may sense a light signal having a predetermined pattern by using the illumination sensor. FIG. 7C illustrates an example of a case where at least one lighting devices are pre-selected by using the light signal.

Figure 7C:
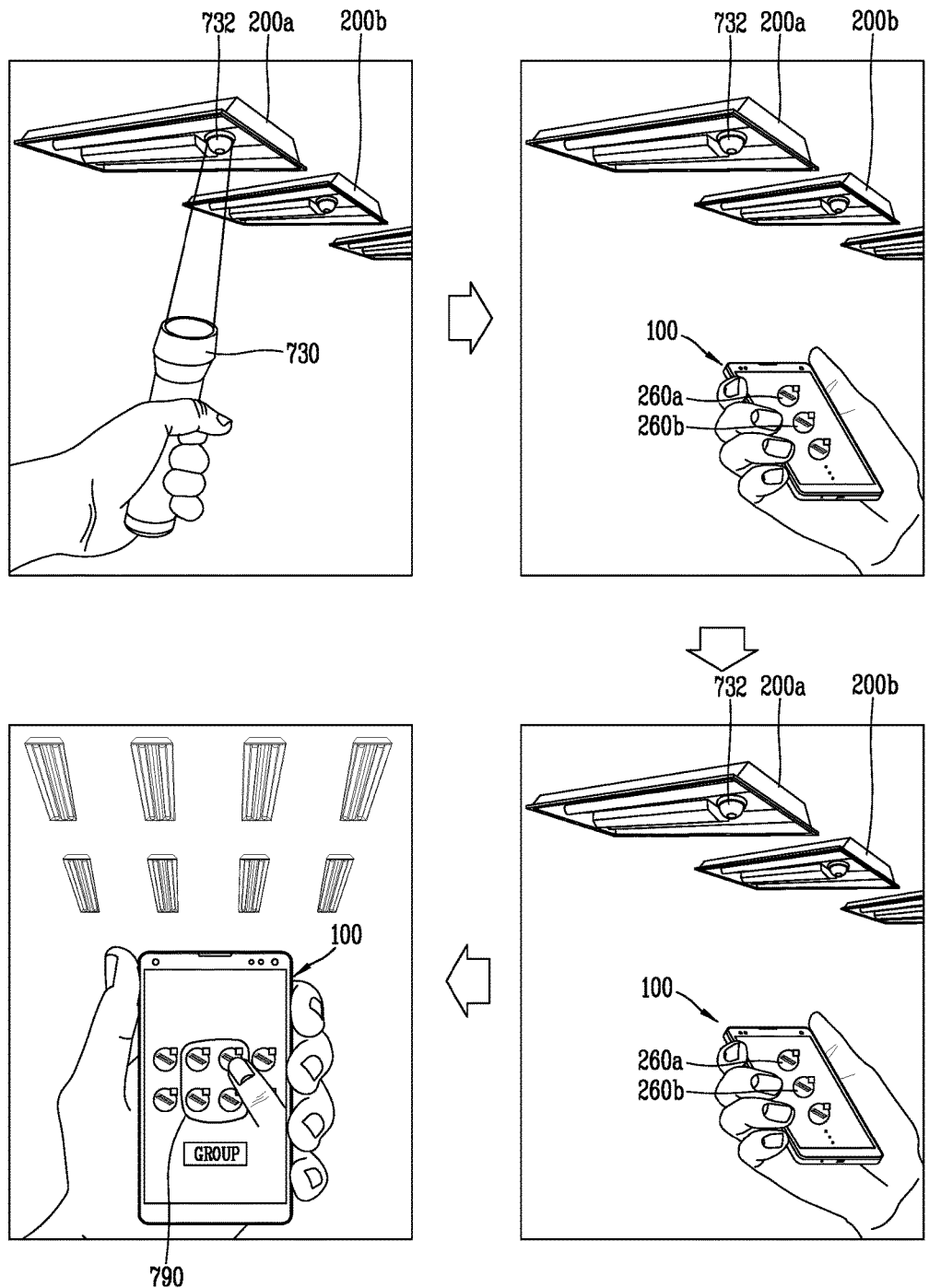

As illustrated in the first drawing of FIG. 7C, a signal transceiver of a lighting device according to an embodiment of the present invention may sense a light signal transmitted from a light signal output device 730 which outputs the light signal having a predetermined pattern. Therefore, a signal transceiver 732 may update state information according to the sensed light signal. For example, when the light signal is sensed, the signal transceiver 732 may update a predetermined flag from an off state to an on state. Also, when state information is updated to the on state, the signal transceiver 732 may transmit registration information about a corresponding lighting device to the mobile terminal 100, based on whether a predetermined condition is satisfied. Here, as described above, the predetermined condition may be whether an operation process according to an embodiment of the present invention starts in the mobile terminal 100.

When the condition is satisfied, lighting devices (for example, a first lighting device 200a and a second lighting device 200b) (i.e., signal transceivers of respective lighting devices) which have sensed the light signal transmitted from the light signal output device 730 may transmit pre-stored registration information about the lighting devices to the mobile terminal 100. Then, as illustrated in the second drawing of FIG. 7C, graphic objects 260a and 260b corresponding to the lighting devices corresponding to registration information may be displayed on the display unit 151 of the mobile terminal 100. Then, as illustrated in the fourth drawing of FIG. 7C, at least one graphic objects may be selected, and lighting devices corresponding to the selected graphic objects may be generated as one group (operation S304 and operation S308 of FIG. 3) or may be simultaneously controlled (operation S306 of FIG. 3).

Figure 7D:
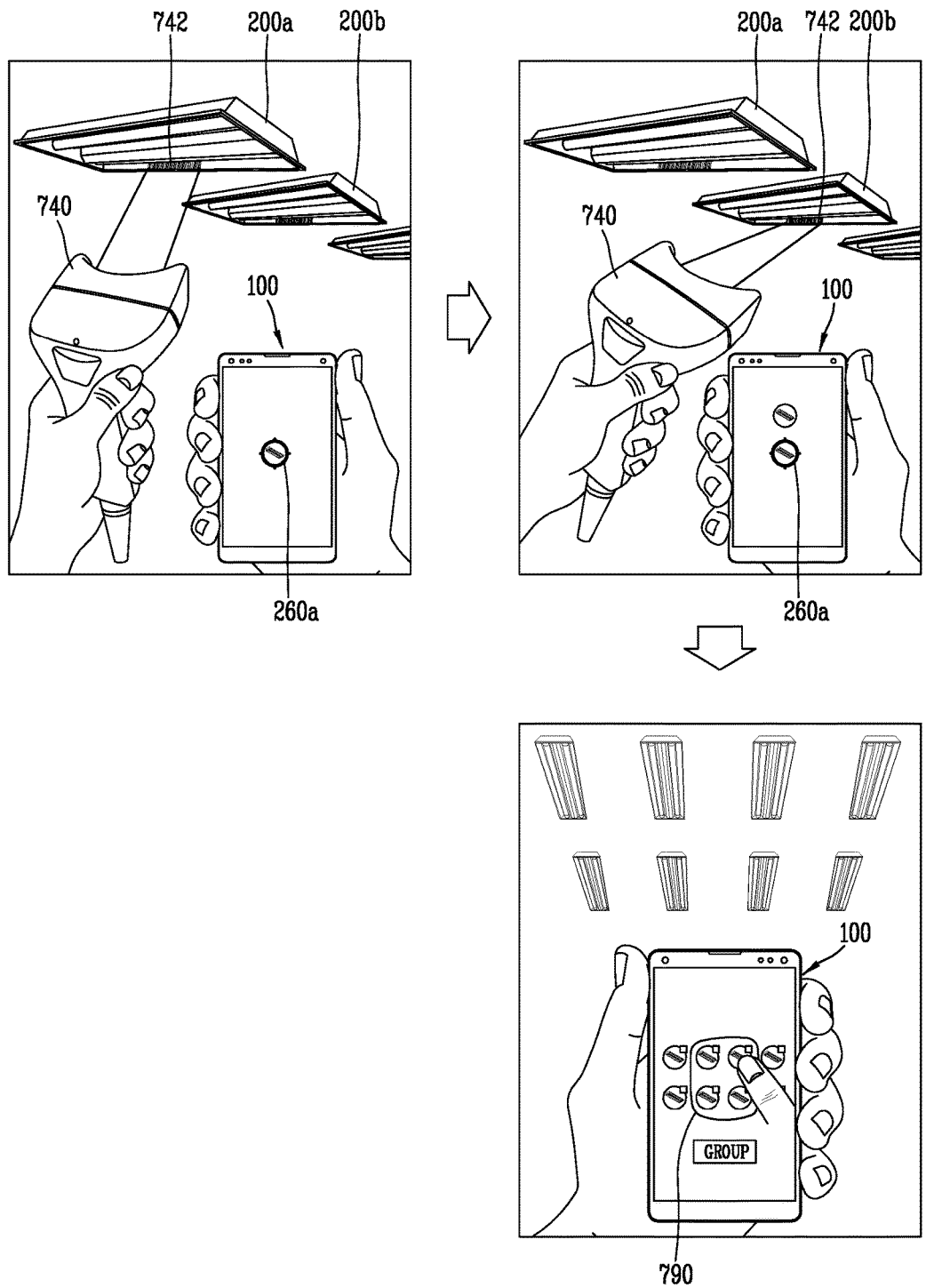

According to above description, it has been described above that each of lighting devices according to an embodiment of the present invention may be provided so that a unique information tag or a unique information code including its own unique information is exposed to at least a portion of an external appearance. FIG. 7D illustrates an example where in a case where lighting devices according to an embodiment of the present invention are provided so that a unique information tag or a unique information code is exposed to at least a portion of an external appearance, specific lighting devices are selected as controllable lighting devices.

To provide description with reference to FIG. 7D, first, the first drawing of FIG. 7D illustrates an example of a first lighting device 200a which is provided so that a unique information code 742 is exposed to at least a portion of an external appearance. In this case, as illustrated in the first drawing of FIG. 7D, the unique information code 742 may be recognized by a recognition device 740 for recognizing the unique information code 742. Also, unique information recognized by the recognition device 740 may be transmitted to the mobile terminal 100, and the mobile terminal 100 may recognize that a lighting device corresponding to the transmitted unique information code is selected. In FIG. 7D, an example where the recognition device 740 and the mobile terminal 100 are separate devices are described, but the mobile terminal 100 may perform a function of the recognition device 740.

In this case, the controller 180 may request registration information about a corresponding lighting device from a signal transceiver of the corresponding lighting device (a first lighting device 700a) corresponding to the unique information code. Then, a signal transceiver of the first lighting device 700a which has received the request may transmit registration information about the first lighting device 200a to the mobile terminal 100, and thus, a graphic object 260a corresponding to the first lighting device 200a may be displayed on the display unit 151 of the mobile terminal 100.

Such a process may be repeated. That is, as illustrated in the second drawing of FIG. 7D, when a unique information code of the second lighting device 200b is recognized by the recognition device 740, registration information about the second lighting device 200b may be transmitted to the mobile terminal 100 in the same manner as that of the first lighting device 200a, and a graphic object 260b corresponding to the second lighting device 200b may be displayed on the display unit 151. Then, as illustrated in the third drawing of FIG. 7D, at least one of graphic objects displayed on the display unit 151 may be grouped as the same group, and lighting devices grouped as one group may be simultaneously controlled according to a selection of the user.

Unlike the illustrations of FIGS. 7A to 7D, the selection of the lighting device may be performed by using an image received by a camera included in the mobile terminal 100. For example, when an image corresponding to a lighting device is received, the controller 180 may allow a region, on which a signal receiver of a corresponding lighting device or unique information about a corresponding lighting device is displayed, to be displayed distinguishably from the received image. In this case, the mobile terminal 100 may recognize a region on which the signal receiver or the unique information is displayed, based on image recognition or a photo sensor such as laser sensor or may recognize a lighting device corresponding to the image received by the camera 121, based on a position of the mobile terminal 100 and a direction which the camera 121 faces.

When a region on which a specific lighting device, a signal receiver of the specific lighting device, or unique information about the specific lighting device is displayed is included in the image received by the camera 121, the controller 180 may allow the region to be displayed so as to be differentiated from another region. That is, as illustrated in the first drawing and the second drawing of FIG. 7E, recognized regions 750 and 752 may be distinguishably displayed as separate graphic objects, and the recognized regions 750 and 752 may respectively correspond to different lighting devices 200a and 200b.

As illustrated in the first drawing and the second drawing of FIG. 7E, the user may select a distinguishably displayed region to select a lighting device corresponding to each region. Also, when the selection of the lighting devices is completed, as illustrated in the third drawing of FIG. 7E, the controller 180 may receive registration information from each of the selected lighting devices and may display graphic objects, corresponding to respective lighting devices corresponding to the received registration information, on the display unit 151. The determination of the completion of the selection may be performed based on a case where a user input for a separate graphic object 750 displayed on the display unit 151 is received, a case where an input of a specific key is sensed, or a case where a predetermined time elapses.

Then, as illustrated in the fourth drawing of FIG. 7E, at least one of graphic objects displayed on the display unit 151 may be grouped as the same group. For example, the controller 180 may display a graphic object 792, which enables the user to select generation of the group, on the display unit 151. In this case, the controller 180 may generate a group including at least one graphic objects according to the selection or not of the graphic object 792, based on an input of the user.

Figure 8:
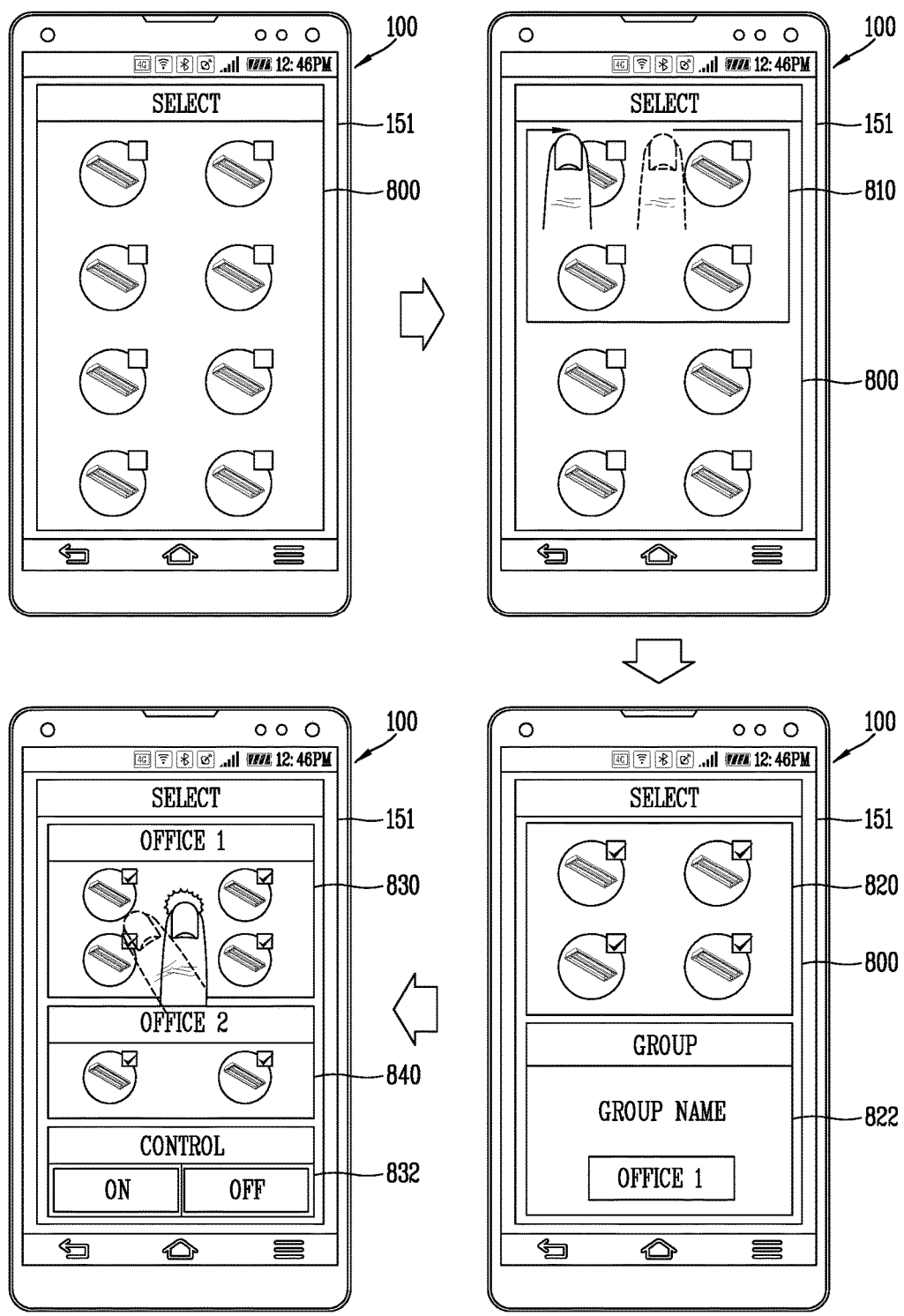
FIG. 8 is an exemplary diagram illustrating in more detail an example where at least one selected lighting devices are grouped according to an embodiment of the present invention.

FIG. 8 is an exemplary diagram illustrating in more detail an example where at least one selected lighting devices are grouped according to an embodiment of the present invention.

To provide description with reference to the first drawing of FIG. 8, first, the first drawing of FIG. 8 illustrates an example where generation of a group is selected by a user. In this case, the controller 180 may generate a group including at least one graphic objects, based on various touch inputs of the user.

For example, as illustrated in the second drawing of FIG. 8, the controller 180 may generate a closed curve 810 based on a trajectory of a touch and drag input of the user applied to the display unit 151. Also, when the closed curve 810 is generated, the controller 180 may distinguish graphic objects currently displayed on the display unit 151, graphic objects located inside the closed curve 810, and other graphic objects. Also, the graphic objects located inside the closed curve 810 may be generated as one group.

When a group including at least one graphic objects is generated according to the trajectory of the touch and drag input of the user, the controller 180 may receive a name of the generate group from the user. To this end, as illustrated in the third drawing of FIG. 8, the controller 180 may display an input window 822, which enables an input of the generated group, on the display unit 151.

As illustrated in the fourth drawing of FIG. 8, the controller 180 may display grouped lighting devices on the display unit 151. In this case, when a region of the display unit 151 on which a specific group is displayed is selected, the controller 180 may allow a currently selected group to be displayed so as to be distinguished from an unselected group. For example, as illustrated in the fourth drawing of FIG. 8, the controller 180 may allow graphic objects included in the currently selected group to be displayed so as to be distinguished from graphic objects of another group.

When a specific group is selected, the controller 180 may allow a control menu 832 for controlling lighting devices, respectively corresponding to graphic objects of a corresponding group, to be displayed. The control menu 832 may include a control command for simultaneously turning on/off lighting devices of a group selected by the user, or may include a control command for controlling illumination of the lighting devices. Alternatively, the control menu 832 may include a control command for setting an on/off reservation time of the lighting devices.

Moreover, when a specific control command is selected by using the control menu 832, the controller 180 may transmit a control signal corresponding to the selected control command to lighting devices respectively corresponding to the graphic objects of the currently selected group. Then, signal transceivers of respective lighting devices which have received the control signal may control a lighting device according to the control signal. Therefore, in the present invention, a user can more easily and conveniently select lighting devices which are to be controlled by the user, and control the selected lighting devices.

In the above description, for convenience of description, an example where lighting devices having the same type are registered, displayed on the display unit 151 of the mobile terminal 100, grouped, and controlled has been described above. However, this is merely an embodiment of the present invention, and the present invention is not limited thereto. That is, even in a case where different kinds of various lighting devices are combined, the present invention may be applied to all cases where the lighting devices can exchange a signal with the mobile terminal 100 according to an embodiment of the present invention and can be controlled according to the control signal transmitted from the mobile terminal 100.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising:
a camera receiving an image;
a wireless communicator exchanging a wireless signal with a plurality of lighting devices; and
a controller transmitting a control signal to at least some of the plurality of lighting devices when identification information about each of the plurality of lighting devices is received through the wireless communicator, for simultaneously controlling the at least some of the lighting devices,
wherein based on information obtained through the mobile terminal or a separate device, the identification information is received in response to a request of the mobile terminal transmitted to at least some of the lighting devices installed in a specific indoor region, or when the mobile terminal satisfies a predetermined condition, the identification information is transmitted from at least some lighting devices pre-selected by a predetermined manner from among the lighting devices installed in the specific indoor region,
wherein when an image including at least some of the lighting devices installed in the specific indoor region is received from the camera, the controller receives the identification information from the at least some of the lighting devices installed in the specific indoor region, based on an input of a user for the image, and
wherein the controller allows at least one specific region corresponding to the lighting devices to be displayed distinguishably from the image received from the camera and selects lighting devices, from which the identification information is to be requested, in the at least one specific region, based on a sensed input of a user.

2. The mobile terminal of claim 1, further comprising a display unit displaying a graphic object corresponding to each of the plurality of lighting devices.

3. The mobile terminal of claim 2, wherein the identification information further comprises information related to a position of each of the plurality of lighting devices, and
wherein the mobile terminal calculates the position of each of the plurality of lighting devices, based on the position-related information included in the identification information and determines positions of graphic objects displayed on the display unit, based on the calculated position.

4. The mobile terminal of claim 3, wherein the information related to the position of each of the plurality of lighting devices is information about a relative position of each of the plurality of lighting devices calculated by a predetermined separate position tracker.

5. The mobile terminal of claim 4, wherein the information related to the position of each of the plurality of lighting devices is information about where the relative position of each of the plurality of lighting devices calculated by the position tracker is matched with drawing information corresponding to the specific indoor region.

6. The mobile terminal of claim 2, wherein the controller generates a group including at least one graphic objects, based on an input of a user applied to the display unit, and
wherein when a control command for the generated group is selected, the controller controls the wireless communicator so that a control signal corresponding to the selected control command is simultaneously transmitted to lighting devices corresponding to the graphic objects of the group.

7. The mobile terminal of claim 6, wherein the input of the user is a trajectory of a touch and drag input of the user applied to the display unit, and
wherein the group is generated based on a closed curve generated based on the touch and drag input.

8. The mobile terminal of claim 1, wherein the lighting devices installed in the specific indoor region comprise at least one infrared sensor for sensing an infrared signal and at least one photo sensor for sensing a light signal having a predetermined pattern, and
wherein the plurality of lighting devices are some lighting devices which are selected from among the lighting devices installed in the specific indoor region, based on the infrared signal or the light signal transmitted from the mobile terminal or a predetermined separate device.

9. The mobile terminal of claim 1, wherein the lighting devices installed in the specific indoor region transmit a predetermined signal in a specific direction, and
wherein the mobile terminal senses a signal transmitted from at least one of the lighting devices installed in the specific indoor region and receives the identification information from lighting devices corresponding to the sensed signal.

10. The mobile terminal of claim 1, wherein each of the lighting devices installed in the specific indoor region has a code which corresponds to predetermined information and is exposed to at least a portion of an external appearance thereof, and
wherein the mobile terminal recognizes the exposed at least one code through a predetermined separate device and receives the identification information from at least one lighting device corresponding to a result of the recognition.

11. The mobile terminal of claim 1, wherein the mobile terminal is a dongle type device connected to another device.

12. The mobile terminal of claim 11, wherein the mobile terminal transmits graphic objects respectively corresponding to the plurality of lighting devices and position information based on a relative position of each of the plurality of lighting devices to the other device, and
wherein the other device displays the graphic objects respectively corresponding to the plurality of lighting devices on a display unit, based on the graphic objects and the position information transmitted from the mobile terminal.

13. A control method of a mobile terminal, the control method comprising:
searching for a controllable lighting device, based on identification information received from a plurality of lighting devices;
displaying graphic objects corresponding to the found at least one lighting devices;
generating a group including at least one graphic objects, based on an input of a user for the displayed graphic objects; and
when there is a control command of the user for the generated group, transmitting a control signal corresponding to the control command to lighting devices respectively corresponding to the graphic objects included in the group,
wherein based on information obtained through the mobile terminal or a separate device, the identification information is received in response to a request of the mobile terminal transmitted to at least some of lighting devices installed in a specific indoor region, or when the mobile terminal satisfies a predetermined condition, the identification information is transmitted from at least some lighting devices pre-selected by a predetermined manner from among the lighting devices installed in the specific indoor region,
wherein the searching for a controllable lighting device further comprises:
receiving an image including at least some of the lighting devices installed in the specific indoor region;
displaying distinguishably at least one specific region corresponding to the lighting devices;
selecting at least some of the lighting devices, from which the identification information is to be requested, in the at least one specific region, based on a sensed input of a user; and
receiving the identification information from the at least some of the lighting devices.

* * * * *